United States Patent [19]

Zupancic

[11] Patent Number: 4,529,673
[45] Date of Patent: * Jul. 16, 1985

[54] ELECTROCHEMICAL CELL HAVING A SAFETY VENT CLOSURE

[75] Inventor: Ronald L. Zupancic, Parma Heights, Ohio

[73] Assignee: Union Carbide Corporation, Danbury, Conn.

[*] Notice: The portion of the term of this patent subsequent to May 11, 1999 has been disclaimed.

[21] Appl. No.: 404,350

[22] Filed: Jul. 30, 1982

[51] Int. Cl.³ .............................................. H01M 2/12
[52] U.S. Cl. ........................................ 429/53; 429/54; 429/56; 429/82
[58] Field of Search ................................. 429/53–56, 429/82

[56] References Cited

U.S. PATENT DOCUMENTS

| | | |
|---|---|---|
| 2,282,459 | 5/1942 | Deeley .............................. 429/56 X |
| 3,415,690 | 12/1968 | Richman . |
| 3,556,863 | 1/1971 | Nathe ................................. 429/55 |
| 3,664,878 | 5/1972 | Amthor . |
| 3,871,923 | 3/1975 | Ikeda ............................... 429/82 X |
| 4,207,385 | 6/1980 | Hayama ............................ 429/56 |
| 4,328,289 | 5/1982 | Zupancic et al. ............... 429/56 X |
| 4,329,405 | 5/1982 | Zupancic ......................... 429/56 |
| 4,338,382 | 7/1982 | Fritts ................................. 429/53 |
| 4,397,919 | 8/1983 | Ballard ............................ 429/53 |

*Primary Examiner*—Brian E. Hearn
*Assistant Examiner*—Stephen J. Kalafut
*Attorney, Agent, or Firm*—Cornelius F. O'Brien

[57] ABSTRACT

A non-resealable vent closure for galvanic cells, such as nonaqueous oxyhalide cells, which comprises a member force-fitted within a vent orifice and wherein a corrosion-resistant material which is not an integral part of the force-fitted member is disposed between the wall defining the vent orifice and the force-fitted member so as to predictably insure venting after a predetermined gas pressure build-up within the cell.

17 Claims, 6 Drawing Figures

ELECTROCHEMICAL CELL HAVING A SAFETY VENT CLOSURE

DESCRIPTION

1. Technical Field

This invention relates to a safety, non-resealable vent closure for galvanic cells, such as nonaqueous cells, which comprises the employment of a member force-fitted within a vent orifice in the cell's housing and having a material that is corrosion-resistant to the cell components disposed at the interface of the wall defining the vent orifice and the force-fitted member, and not an integral part of the force-fitted member, and in which the force-fitted member and/or the interfacial material is resiliently deformable, thereby providing a normally fluid-tight seal at said vent orifice. The invention also relates to a method of producing the safety vent closure of this invention.

2. Background Art

Galvanic cells may generate large quantities of gas under certain conditions during use. Since many such cells are required to be tightly sealed in order to prevent loss of electrolyte by leakage, high internal gas pressures may develop. Such pressures may cause leakage, bulging or possible rupture of the cell's container under abusive conditions if not properly vented.

In the past, several different types of resealable pressure relief vent valves have been used for releasing high internal gas pressures from inside a sealed galvanic cell. One type of valve that has been commonly used consists basically of a valve member such as a flat rubber gasket which is biased into sealing position over a vent orifice by means of a resilient member such as a helical spring. The resilient member or spring is designed to yield at a certain predetermined internal gas pressure so as to momentarily break the seal and allow the gas to escape through the vent orifice.

In U.S. Pat. No. 3,664,878 to Amthor issued on May 23, 1972, a resealable vent is disclosed which comprises a resilient deformable ball of elastomeric material positioned to overlie a vent orifice provided within the cell's container. A retainer means is positioned over the resilient ball for maintaining the ball in place over the vent orifice and in contact with a valve seat provided around the peripheral edge portions of the vent orifice and for compressing and deforming the resilient ball into a flattened configuration forming a normally fluid-tight seal between the flattened ball and the valve seat. The resilient ball is capable of undergoing further temporary deformation upon the build-up of a predetermined high internal gas pressure inside the container so as to momentarily break the seal and allow gas to escape through the vent orifice.

However, with the continuing development of portable electrically powered devices such as tape recorders and playback machines, radio transmitters and receivers, and the like, a new type of reliable, long service life cells or batteries has been developed. These newly developed electrochemical cell systems provide a long service life by utilizing highly reactive anode materials such as lithium, sodium and the like, in conjunction with high energy density nonaqueous liquid cathode materials and a suitable salt.

It has recently been disclosed in the literature that certain materials are capable of acting both as an electrolyte carrier, i.e., as solvent for the electrolyte salt, and as the active cathode for a nonaqueous electrochemical cell. U.S. application Ser. No. 439,521 by G. E. Blomgren et al filed Feb. 4, 1974, which is a continuation-in-part of application Ser. No. 212,582 filed on Dec. 27, 1971, discloses a nonaqueous electrochemical cell comprising an anode, a cathode collector and a cathode-electrolyte, said cathode-electrolyte comprising a solution of an ionically conductive solute dissolved in an active cathode depolarizer wherein said active cathode depolarizer comprises a liquid oxyhalide of an element of Group V or Group VI of the Periodic Table. The "Periodic Table" is the Periodic Table of Elements as set forth on the inside back cover of the Handbook of Chemistry and Physics, 48th Edition, The Chemical Rubber Co., Cleveland, Ohio, 1967–1968. For example, such nonaqueous cathode materials would include sulfuryl chloride, thionyl chloride, phosphorus oxychloride, thionyl bromide, chromyl chloride, vanadyl tribromide and selenium oxychloride.

Another class of liquid cathode materials would be the halides of an element of Group IV to Group VI of the Periodic Table. For example, such nonaqueous cathode material would include sulfur monochloride, sulfur monobromide, selenium tetrafluoride, selenium monobromide, thiophosphoryl chloride, thiophosphoryl bromide, vanadium pentafluoride, lead tetrachloride, titanium tetrachloride, disulfur decafluoride, tin bromide trichloride, tin dibromide dichloride and tin tribromide chloride.

It has been found that when employing high energy density liquid cathode materials in nonaqueous cell systems, the cells exhibit higher voltages than cells employing conventional aqueous systems which results in fewer cell units being required to operate a particular battery-powered device. In addition, many of the oxyhalide and halide nonaqueous cells display relatively flat discharge voltage-versus-time curves. Thus these cells can be employed to produce batteries that will provide a working voltage closer to a designated cut-off voltage than is practicable with some conventional aqueous systems which generally do not exhibit flat discharge voltage-versus-time curves.

However, one possible disadvantage in the use of oxyhalide and halide liquid cathode nonaqueous cells is that it may be possible that during storage or use, some of the oxyhalide, halide or their reaction products may escape from the cell. This escape of liquids and/or gases could cause damage to the device employing the cell or to the surface of a compartment or shelf where the cell is stored. On the other hand, if the seal of the cell is effectively permanently secured, then it is possible that the build-up of internal pressure within the cell could cause the cell's container to rupture which may cause property and/or bodily damage. To prevent rupture of the cell's container from possible internal pressure build-up caused under abusive conditions, such as charging and exposure to a high temperature environment, it is necessary to vent the cell at some predetermined pressure. It has been reported that some oxyhalides such as thionyl chloride and sulfuryl chloride should be vented at pressures below about 500 psi and preferably between about 150 and 300 psi.

Applicant's issued U.S. Pat. No. 4,329,405 discloses a safety blow-out vent closure for galvanic cells, such as nonaqueous oxyhalide cells, which comprises the employment of a conductive tubular member secured to the cell's housing and surrounding a vent orifice in the cell's housing and wherein a deformable member is force-fitted in said vent orifice and adapted to at least partially be ejected from the vent orifice upon the build-up of a predetermined internal gas pressure within the cell. In some applications, the wall defining the vent orifice in the cover could be subjected to corrosion at the deformable member-wall interface. This corrosion could roughen the wall surface and thereby increase the coefficient of friction between the deformable member and the wall of the vent orifice thereby resulting in the venting of the cell at unpredictable pressures.

It is, therefore, an important object of this invention to provide a safety non-resealable vent closure for electrochemical cells, specifically oxyhalide cells that will vent at a predictable low pressure.

It is another object of this invention to provide a safety non-resealable vent closure for cylindrical cells employing, for example, oxyhalides as the active cathodic material.

It is another object of this invention to provide a safety non-resealable vent closure for nonaqueous cells that is inexpensive to manufacture and easy to assemble.

It is another object of the present invention to provide a method for assembling the solid components of the cell in a container followed by closing the container with a cover and then adding the liquid components of the cell prior to assembling the safety vent closure of this invention onto the cell's housing.

The foregoing and additional objects will become fully apparent from the following description and the accompanying drawings.

DISCLOSURE OF THE INVENTION

The invention relates to an electrochemical cell in which the active components of the cell are assembled within a housing comprising a container closed at its open end by a cover and having at least one safety vent orifice containing a member force-fitted within the vent orifice to provide a normally fluid-tight seal for said vent orifice, the improvement wherein a material that is corrosion-resistant to the cell's active components and not an integral part of the force-fitted member is disposed at the interface of the wall defining the vent orifice and the member force-fitted within said vent orifice and wherein at least one of said force-fitted member and said corrosion-resistant material is resiliently deformable, such that said force-fitted member is adapted to be at least partially expelled from the vent orifice upon a build-up of a predetermined internal gas pressure inside the cell thereby providing a permanent vent to the atmosphere.

As used herein, an integral part of a member shall mean one that is secured and/or bonded to the member.

The interfacial material that is corrosion-resistant to the cell's active components such as oxyhalides may be disposed at the interface of the wall defining the vent orifice and the member force-fitted within the vent orifice by using one of several means such as coating the wall defining the vent orifice with a corrosion-resistant material, or placing a corrosion-resistant material between the wall defining the vent orifice and the member force-fitted within the vent orifice. In the latter case, the corrosion-resistant interfacial material could be formed from (1) a sheet material molded to shape during the force-fitting of the member within the vent orifice; (2) using a premolded insert within the vent orifice in the cell's housing; (3) molding an insert within the vent orifice in situ; or (4) cutting a tube of corrosion-resistant material and then using it as the liner for the vent orifice whereupon the ends of the tubing could be flared over the wall of the cell's housing which defines the vent orifice. In each embodiment, the corrosion-resistant material must not form an integral part of the force-fitted member. This is necessary to insure that if any corrosion to the wall of the orifice occurs it will be confined to the interface of the wall and the corrosion-resistant material and thus does not effectively alter the vent release pressure of the force-fitted member.

Suitable corrosion-resistant materials for use in the invention include nylon, polyethylene, polytetrafluoroethylene, fluorinated ethylene-propylene polymer, perfluoroalkoxy polymer, ethylene-fluorinated ethylene polymer, waxes, glasses and metals. It is to be understood that the selection of the proper material will depend on the electrochemical system employed in order to insure its corrosion resistance. When using soft materials such as waxes or greases, it is possible that they could be applied either to the force-fitted member or to the vent orifice walls. When using materials as a liner, such liner could be disposed adjacent the wall defining the vent orifice.

By disposing the corrosion-resistant material adjacent the wall defining the vent orifice and the member force-fitted within the vent orifice, the venting of the cell at low pressures can be insured because the risk of having any corrosion occurring between the force-fitted member and the wall defining the orifice is effectively eliminated. As stated above, any corrosion occurring at the interface will increase the coefficient of friction between the force-fitted member and the wall defining the vent orifice which will result in an unpredictable increase in vent release pressure. By employing the corrosion-resistant material sandwiched between the wall defining the orifice and the force-fitted member, any corrosion to the wall of the orifice will not impede at least a partial ejection of the force-fitted member to provide a permanent vent to the atmosphere when subjected to a low pressure build-up within the cell.

In a preferred embodiment of the cell, a conductive tubular member would completely surround the vent orifice and preferably would be secured to the cell's housing. This tubular member could function as a terminal of the cell.

Preferably, a layer of a sealant material such as asphalt or wax could be disposed within the tubular member over the force-fitted member and the area of the housing defining the vent orifice surrounded by the tubular member. The advantage of the sealant material is that it will provide maximum leakage resistance as well as further increase reliability to vent after a predesignated pressure builds up. Suitable sealing materials could include halocarbon wax which is a saturated low-molecular weight polymer of chlorotrifluoroethylene having the general formula: $-(CH_2-CFCl)_n-$, asphalt, epoxy or any materials which are resistant to moisture, have reasonable adhesion to metal and can be applied easily. Preferably the material should be applied in liquid form and then set to a solid.

The invention also relates to a method for assembling an electrochemical cell having a safety vent closure which comprises the steps:

(a) placing the solid components of a cell within the container of a cell's housing, said housing comprising the container having secured at its open end a cover and said housing having at least one vent orifice;

(b) feeding the liquid component of the cell through the vent orifice into the housing; and (c) force-fitting a member and a film or sheet of corrosion-resistant material into the vent orifice in which at least one of said member and said material is resiliently deformable such that the corrosion-resistant material becomes disposed at the interface of the wall defining the vent orifice and the force-fitted member thereby providing a fluid-tight seal at said vent orifice.

Another method for assembling an electrochemical cell having a safety vent closure would comprise the steps:

(a) placing the solid components of a cell within the container of a cell's housing, said housing comprising the container having secured at its open end a cover and said housing having at least one vent orifice wherein the wall defining said vent orifice has a liner or coating of a corrosion-resistant material;

(b) feeding the liquid component of the cell through the vent orifice into the housing; and (c) force-fitting a member into the vent orifice in which at least one of said member and said material is resiliently deformable such that the corrosion-resistant material is disposed between the force-fitted member and the wall defining the orifice thereby providing a fluid-tight seal at said vent orifice.

In the above-described methods step (d) could be added as follows:

(d) placing a layer of a sealant over the force-fitted member and the area of the housing defining the vent orifice.

Preferably, in the above-described methods the steps (a) and (d) could be modified as follows:

(a) securing at least one tubular member to said housing and surrounding said at least one vent orifice; and (d) placing a layer of a sealant within said tubular member over the force-fitted member and the area of the housing defining the vent orifice and surrounded by the tubular member.

As used herein, the force-fitted member could be made of metals, glass or ceramics but preferably should be resiliently deformable and be made of a material or coated with a material that is chemically resistant to the cell's components, particularly the cell's liquid components. For nonaqueous oxyhalide cell systems, the deformable material can be selected from the group consisting of polytetrafluoroethylene, fluorinated ethylene-propylene copolymer, perfluoroalkoxyethylene polymer, ethylene-tetrafluoroethylene copolymer and the like. When the deformable material is to be coated with a chemically inert material, the said deformable material can be selected from the group consisting of nylon, hard rubber and the like. Other suitable materials for use in this invention but not suitable for some of the oxyhalide cell systems are nylon, polypropylene, polycarbonate, acrylic polymers and the like.

The tubular member, when employed, can be cylindrical, square, rectangular or have any polygonal-shaped cross section. In the preferred embodiment, the cell will be a cylindrical cell in which the vent orifice is disposed in the cell's cover and wherein the conductive tubular member, which serves as an electrical terminal for the cell, will be a cylindrical member having an outwardly disposed flange at one end which is adapted for securing to the cell's cover. The tubular member is ideally suited as an element to which conductive strips can be welded to serve as external leads. Preferably, the deformable member should have a smooth spherical configuration and the wall defining the vent orifice should be substantially smooth.

The safety vent closure of this invention using a force-fitted member can be made to vent at any predetermined pressure build-up within the cell by regulating the size of the vent opening with respect to the size of the force-fitted member, the material of which the force-fitted member is made, the degree of deformation required of the force-fitted member and/or corrosion-resistant material, the thickness and material of which the corrosion-resistant material is made, and the shapes of the vent opening and the force-fitted member. In the practice of this invention, the force-fitted member can be inserted rapidly into the orifice with a minimum of force to attain a reliable and predictable safety vent closure. The use of a controlled height dead-stop ram to insert the force-fitted member would be most desirable for automatic assembly operations.

A preferred version of the safety vent closure of this invention utilizes a polytetrafluoroethylene ball with a halocarbon wax overseal in which the ball is compressed 10 to 20 percent upon insertion into a vent opening in a lithium/oxyhalide cell in which a liner or layer of polytetrafluoroethylene is disposed between the ball and the wall defining the vent orifice. Once inserted, the ball will maintain a substantially spheroidal configuration. This venting means is ideally suited for lithium/oxyhalide cell systems, specifically those employing sulfuryl chloride and/or thionyl chloride.

The safety non-resealable vent closure of this invention preferably can be employed with all size cylindrical cells and is ideally suited for liquid cathode cell systems employing, for example, a liquid oxyhalide. In addition to providing an excellent and effective safety venting means, the invention also permits the initial assembling of the solid components of a cell within a container that can be closed in a conventional manner before adding the cell's liquid component. When the cell's liquid component is an oxyhalide-based liquid cathode, such as thionyl chloride or sulfuryl chloride, then these corrosive liquids can be injected into the cell's housing through the small vent orifice, e.g., by vacuum filling, after the cell cover is secured to the container. This will effectively eliminate the corrosion of crimping equipment used to close the cell as well as eliminating contamination at the interfaces of the container-gasket and gasket-cover of the cell by the oxyhalide.

A cell for use in this invention can be the split internal anode/outer cathode collector construction as described in U.S. Pat. No. 4,032,696 or the split internal cathode collector construction as described in U.S. Pat. No. 4,048,389, said U.S. Pat. Nos. 4,032,696 and 4,048,389 being incorporated herein by reference.

Suitable nonaqueous liquid cathode materials for use in cells of this invention could be one or more of the liquid oxyhalides of an element of Group V or Group VI of the Periodic Table and/or one or more of the halides of an element of Group IV to Group VI of the Periodic Table, said Periodic Table being the Periodic Table of Elements as set forth on the inside back cover of the Handbook of Chemistry and Physics, 48th Edition, The Chemical Rubber Co., Cleveland, Ohio, 1967–1968. For example, such nonaqueous cathode materials would include sulfuryl chloride, thionyl chloride, phosphorus oxychloride, thionyl bromide, chromyl chloride, vanadyl tribromide, selenium oxychloride, sulfur monochloride, sulfur monobromide, selenium tetrafluoride, selenium monobromide, thiophosphoryl chloride, thiophosphoryl bromide, vanadium pentafluoride, lead tetrachloride, titanium tetrachloride, disulfur decafluoride, tin bromide trichloride, tin dibromide dichloride and tin tribromide chloride. Another suitable cathode material would be liquid sulfur dioxide.

Anodes suitable for use in nonaqueous liquid cathode cell systems can be generally consumable metals and include the alkali metals, alkaline earth metals and alloys of alkali metals or alkaline earth metals with each other and other metals. The term "alloy" as used herein is intended to include mixtures; solid solutions such as lithium-magnesium; and intermetallic compounds such as lithium monoaluminide. The preferred anode materials are the alkali metals and particularly lithium, sodium and potassium. When using lithium anodes the anode may be coated with a vinyl resin as disclosed in U.S. Pat. No. 3,993,501, said patent incorporated herein by reference.

The cathode collector for use in liquid cathode cell systems has to be electronically conductive so as to permit external electrical contact to be made with the active cathode material and also provide extended area reaction sites for the cathodic electrochemical process of the cell. Materials suitable for use as a cathode collector are carbon materials and metals such as nickel, with acetylene black being preferable. In addition, the cathode collector when made of a particulate material should be capable of being molded directly within a can or capable of being molded into various size discrete bodies that can be handled without cracking or breaking. To impart a cohesive characteristic to some types of cathode collectors, such as carbonaceous cathode collectors, a suitable binder material, with or without plasticizers and with or without stabilizers, can be added to the cathode collector materials. Suitable binder materials for this purpose may include vinyl polymers, polyethylene, polypropylene, polyacrylics, polystyrene and the like. For example, polytetrafluoroethylene would be the preferred binder for cathode collectors for use with liquid oxyhalide cathodes. The binder, if required, should be added in an amount between about 5% and about 30% by weight of the molded cathode collector since an amount less than 5% would not provide sufficient strength to the molded body while an amount larger than 30% would wetproof the surface of the carbon and/or reduce the available surface of the carbon, thereby reducing the activation site areas required for the cathodic electrochemical process of the cell. Preferably, the binder should be between 10% and 25% by weight of the cathode collector. Of importance in selecting the materials for the cathode collector is to select materials that will be chemically stable in the cell system in which they are to be used.

A solute for use in liquid cathode cell systems may be a simple or double salt which will produce an ionically conductive solution when dissolved in a suitable solvent. Preferred solutes for nonaqueous systems are complexes of inorganic or organic Lewis acids and inorganic ionizable salts. The only requirements for utility are that the salt, whether simple or complex, be compatible with the solvent being employed and that it yield a solution which is ionically conductive. According to the Lewis or electronic concept of acids and bases, many substances which contain no active hydrogen can act as acids or acceptors of electron doublets. The basic concept is set forth in the chemical literature (Journal of the Franklin Institute, Vol. 226, July/December, 1938, pages 293-313 by G. N. Lewis).

A suggested reaction mechanism for the manner in which these complexes function in a solvent is described in detail in U.S. Pat. No. 3,542,602 wherein it is suggested that the complex or double salt formed between the Lewis acid and the ionizable salt yields an entity which is more stable than either of the components alone.

Typical Lewis acids suitable for use in conjunction with liquid oxyhalide cathodes include aluminum fluoride, aluminum bromide, aluminum chloride, antimony pentachloride, zirconium tetrachloride, phosphorus pentachloride, boron fluoride, boron chloride and boron bromide.

Ionizable salts useful in combination with the Lewis acids include lithium fluoride, lithium chloride, lithium bromide, lithium sulfide, sodium fluoride, sodium chloride, sodium bromide, potassium fluoride, potassium chloride and potassium bromide.

It will be obvious to those skilled in the art that the double salts formed by a Lewis acid and an ionizable salt may be used as such or the individual components may be added to the solvent separately to form the salt or the resulting ions in situ. One such double salt, for example, is that formed by the combination of aluminum chloride and lithium chloride to yield lithium aluminum tetrachloride.

If desired, and specifically for the halides, a cosolvent should be added to the liquid active reducible cathode and solute solution to alter the dielectric constant, viscosity or solvent properties of the solution to achieve better conductivity. Some examples of suitable cosolvents are nitrobenzene, tetrahydrofuran, 1,3-dioxolane, 3-methyl-2-oxazolidone, propylene carbonate, γ-butyrolactone, sulfolane, ethylene glycol sulfite, dimethyl sulfite, benzoyl chloride, dimethoxyethane, dimethyl isoxazole, diethyl carbonate, sulfur dioxide and the like.

Suitable separators for use with liquid cathodes in nonaqueous cells are the nonwoven glass separators.

The container of the cell could be made of stainless steel, iron, nickel, plastic, coated metals or some other suitable material.

Some preferred combinations of nonaqueous cathode materials and anodes would be as follows:
1 sulfuryl chloride/Li or Na;
2 thionyl chloride/Li or Na;
3 phosphorus oxychloride/Li or Na;
4 sulfur monochloride/Li or Na;
5 sulfur monobromide/Li or Na;
6 selenium tetrafluoride/Li or Na.

Preferably, the cells for use in this invention would be liquid oxyhalide cells using sulfuryl chloride, thionyl chloride or mixtures thereof with a lithium anode.

It is to be understood that the safety vent closure of this invention could be used in other cell systems such as, for example, Leclanche dry cells, zinc chloride cells, lithium-$MnO_2$ cells, lithium-iron sulfide cells, alkaline-$MnO_2$ cells, nickel-cadmium cells, and lead-acid cells.

The present invention will become more apparent from the following description thereof when considered together with the accompanying drawing which is set forth as being exemplary of embodiments of the present invention and is not intended in any way to be limitative thereof and wherein FIG. 1 is a vertical cross sectional view of an electrochemical cell having its solid components fully assembled within a housing and being ready for receiving the liquid component of the cell.

Figure 1:
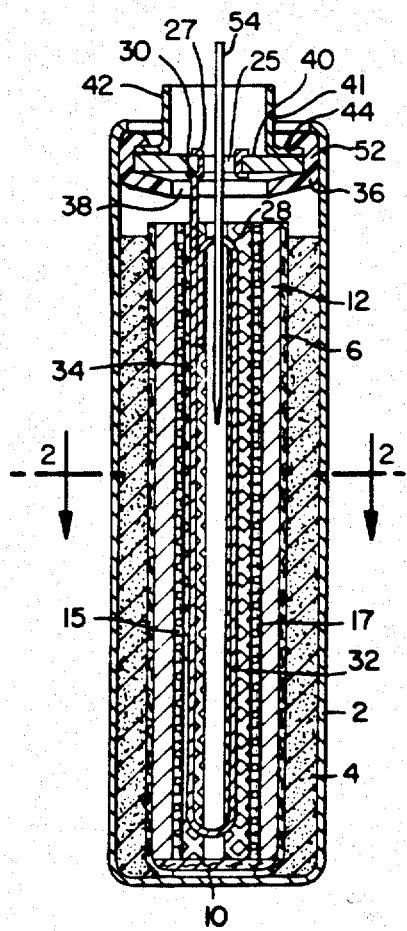

Referring in detail to FIG. 1, there is shown a cross sectional view of a cylindrical cell comprising a cylindrical container 2 having disposed therein a cathode collector shell 4 in contact with the inner upstanding circumference of the container 2 thereby adapting the container as the cathodic or positive terminal for the cell. Disposed within and in contact with the inner circumference of cathode collector 4 is a separator liner 6 with its bottom separator or disc 10. If desired, the cathode collector material could be extruded within the container 2, rolled with the container material or composed of one or more segments to form a cylindrical tube and then placed in the container.

Figure 2:
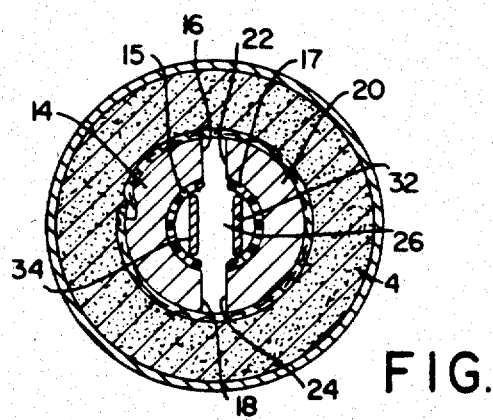
FIG. 2 is an enlarged horizontal cross sectional view taken along line 2—2 of FIG. 1.

A two-member anode 12 is shown in FIGS. 1 and 2 comprising a first half cylindrical annular member 14 having flat end faces 16 and 18 and a second half cylindrical annular member 20 having flat end faces 22 and 24. When the flat end faces of each cylindrical half member are arranged in an opposing fashion as shown in FIGS. 1 and 2, an axial cavity 26 is defined between the cylindrical half annular members 14 and 20.

If desired, arcuate type backing sheets 15 and 17, such as inert electrically conductive metal screens or grids, could be disposed against the inner surface wall of the anode bodies 14 and 20, respectively, to provide uniform current distribution over the anode. This will result in a substantially uniform consumption or utilization of the anode while also providing a substantially uniform spring pressure over the inner wall surface of the anode as will be discussed below.

An electrically conductive spring strip 28 is appropriately bent into a flattened elliptically-shaped member having an extending end 30. When inserting the spring strip 28 into a container, the legs 32, 34 of the conductive strip 28 are squeezed together and forced into the axial opening between the two screen-backed anode members arranged in a container as shown in FIGS. 1 and 2. The inserted conductive spring strip 28 resiliently biases the two anode members 14 and 20 via backing screens 15 and 17 so as to provide a substantially uniform and continuous pressure contact over the inner wall of the anode members. The extended end 30 of spring strip 28 is shown projected above the surface of anode members 14 and 20. An insulating gasket 36 has a central opening 38 through which the projected end 30 of the spring strip 28 passes, whereupon the end 30 is then welded to a cover 40 thereby adapting the cover 40 as the anodic or negative terminal of the cell.

Secured to the cover 40 is a cylindrical tube 42. Specifically, the cylindrical tube comprises a cylindrical segment 41 terminating at one end with an outwardly oriented flange 44 which is secured to cover 40.

The insulating gasket 36 has a peripheral depending skirt 52 disposed between the cover 40 and the upper inner wall of the container 2 for closing the cell through conventional crimping techniques. As shown in FIG. 1, the cylindrical tube is secured to the cover 40 and the cell is closed using conventional crimping techniques with all of the solid components of the cell assembled within the container 2. After the cell is assembled with the solid components, a hypodermic needle 54 or the like is used to inject the liquid component into the assembled cell. Specifically, a cathode-electrolyte comprising a suitable salt dissolved in an oxyhalide, a halide with a cosolvent or mixtures thereof can be dispensed through the cover vent orifice 25 into cavity 26 using the hypodermic needle 54 whereupon it can penetrate through the separator and cathode collector of the cell. As shown in FIG. 1 a polytetrafluoroethylene liner 27 is disposed adjacent the inner wall defining vent orifice 25.

Figure 3:
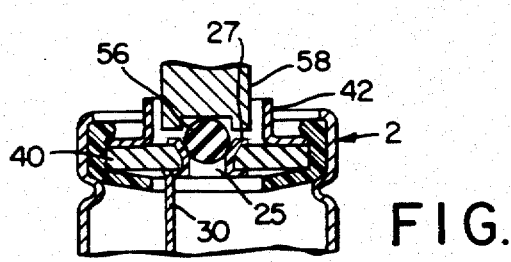
FIG. 3 is a partial vertical cross sectional view of the cell of FIG. 1 after the addition of the liquid component and just prior to inserting the deformable ball into the orifice in the cell's cover and wherein a corrosion-resistant material is disposed adjacent the wall defining the vent orifice.
Figure 4:
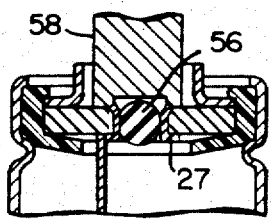
FIG. 4 is a partial vertical cross sectional view of the cell of FIG. 3 after the deformable ball is force-fitted into the vent orifice in the cell's cover and wherein a corrosion-resistant material is disposed between the wall of the vent orifice and the deformable ball.
Figure 5:
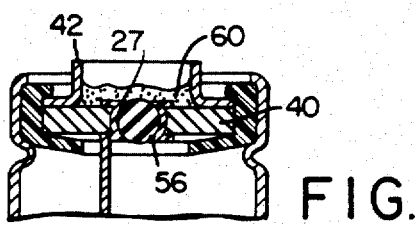
FIG. 5 is a partial vertical cross sectional view of a fully assembled cell.

As shown in FIG. 3, with the cell's liquid component fed into the container, a polytetrafluoroethylene deformable ball 56 is disposed over opening 25 in cover 40 and then a ram member 58 is used to force ball 56 into vent orifice 25 as shown in FIG. 4 whereupon the polytetrafluoroethylene layer 27 is disposed between the wall defining the vent orifice and the deformable ball. After removal of the ram 58, a layer of a sealant 60 is disposed over ball 56 and cover 40 within cylindrical tube 42 producing a fully sealed cell employing the safety vent closure of this invention as shown in FIG. 5. The polytetrafluoroethylene layer 27 isolates the deformable ball from contacting the wall of orifice 25 directly and thereby the deformable ball is not affected if any corrosion occurs to the wall of the orifice upon contact with the cell's components, such as oxyhalide. Upon build-up of a predetermined pressure within the cell, the deformable ball will be at least partially expelled forming a permanent vent to the atmosphere. The coefficient of friction between the deformable ball and the wall of the corrosion-resistant material will remain substantially constant thereby insuring that the cell will vent at a predetermined and predictable pressure build-up within the cell. Without the corrosion-resistant material, any corrosion to the wall of the orifice could retard or delay the expelling of the deformable ball from the orifice thereby resulting in the venting of the cell at unpredictable pressures.

Figure 6:
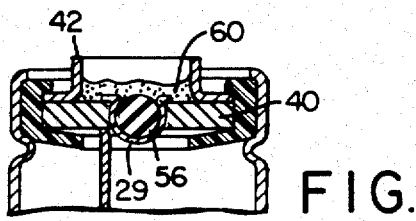
FIG. 6 is another view of a partial vertical cross sectional view of a fully assembled cell wherein a corrosion-resistant sheet was molded to shape when it was inserted into the vent orifice along with the deformable ball.

FIG. 6 shows another embodiment of a cell of this invention having the same components as the cell shown in FIG. 1 through 5 identified with the same reference numbers except that in place of liner 27, a sheet of polytetrafluoroethylene 29 was placed around the deformable ball 56 prior to the ball 56 being forced into the orifice 25. This effectively placed the polytetrafluoroethylene sheet 29 between the deformable ball 56 and the wall defining orifice 25.

Preferably prior to the adding of the liquid component of the cell, a vacuum could be created within the cell whereupon the liquid component could then be drawn effectively into the cell and uniformly distributed therein.

The safety vent closure of this invention will provide a means for venting of rapidly generated high pressure gas built up within a cell thereby preventing the rupture of the cell's container.

The following example is illustrative of the present invention and is not intended in any manner to be limitative thereof.

EXAMPLE

Several cells were made in accordance with FIGS. 1 to 5 with and without a polytetrafluoroethylene liner adjacent the wall defining the vent orifice using the following components:
  anode of lithium,
  cathode collector of polytetrafluoroethylene-bonded acetylene black, and
  thionyl chloride containing 1.5 M $LiAlCl_4$.

Each cell measured 0.475 inch diameter and was 1.63 inch long. The vent orifice for the cells without the liner measured 0.086 inch diameter by 0.05 inch long and the deformable ball was made of polytetrafluoroethylene and had a diameter of 0.090 inch. The vent orifice for the cells with the polytetrafluoroethylene liner measured 0.113 inch in diameter by 0.05 inch long, the liner measured 0.016 inch in thickness and the deformable ball was made of polytetrafluoroethylene and had a diameter of 0.090 inch. In each cell the ball was forced into the vent orifice to produce a cell as basically shown in FIG. 4 except that in some cells a liner was not employed. Some of the cells had a layer of halocarbon wax (obtained from Halocarbon Industries, New Jersey) deposited over the polytetrafluoroethylene ball and the area defining the vent orifice as shown in FIG. 5. The cells were stored at a temperature and relative humidity (R.H.) for a period of time as shown in the table and the average vent pressure observed for each lot of cells is reported in the Table.

|  | Cells Without Liner | | | | Cells With Liner | | | |
|---|---|---|---|---|---|---|---|---|
|  | Wax Seal | | Without Wax Seal | | Wax Seal | | Without Wax Seal | |
| Storage Condition | No. of Cells | Pressure (psig) | No. of Cells | Pressure (psig) | No. of Cells | Pressure (psig) | No. of Cells | Pressure (psig) |
| 5 days at 21° C. and 60% R. H. | 3 | 322 | 3 | 833 | 3 | 280 | 3 | 242 |
| 2 weeks at 30° C. and 90% R. H. | 5 | 680 | 4 | 756 | 3 | 337 | 4 | 344 |

What is claimed is:

1. An electrochemical cell in which the active components of the cell are assembled within a housing comprising a container closed at its open end by a cover and having at least one safety vent orifice containing a member force-fitted within the vent orifice to provide a normally fluid-tight seal for said vent orifice, the improvement wherein a material that is corrosion-resistant to the cell's active components and not an integral part of the force-fitted member is disposed at the interface of the wall defining the vent orifice and the member force-fitted within said vent orifice and wherein at least one of said force-fitted member and said corrosion-resistant material is resiliently deformable, such that said force-fitted member is adapted to be at least partially expelled from the vent orifice upon a build-up of a predetermined internal gas pressure inside the cell thereby providing a permanent vent to the atmosphere.

2. The electrochemical cell of claim 1 wherein the force-fitted member is made of a material selected from the group consisting of polytetrafluoroethylene, fluorinated ethylene-propylene polymer, perfluoroalkoxyethylene polymer, ethylene-tetrafluoroethylene polymer, nylon, polypropylene, polycarbonate, acrylic polymers, metals, glass and ceramics.

3. The electrochemical cell of claim 1 wherein the material that is corrosion-resistant to the cell's active components is selected from the group consisting of nylon, polyethylene, polytetrafluoroethylene, fluorinated ethylene-propylene polymer, perfluoroalkoxy polymer, ethylene-fluorinated ethylene polymer, waxes, glasses and metals.

4. The electrochemical cell of claim 3 wherein the material that is corrosion-resistant to the cell's active components is a liner disposed adjacent the wall defining the vent orifice.

5. The electrochemical cell of claim 3 wherein the material that is corrosion-resistant to the cell's active components is a sheet that envelopes a substantial portion of the force-fitted member within the vent orifice.

6. The electrochemical cell of claim 1 wherein a conductive tubular member surrounds the vent orifice.

7. The electrochemical cell of claim 6 wherein a layer of a sealant material is disposed within the conductive tubular member over the force-fitted member in the vent orifice and the area of the housing defining the vent orifice surrounded by the conductive tubular member.

8. The electrochemical cell of claim 7 wherein the sealant material is selected from the group consisting of asphalt, wax, halocarbon wax and epoxy.

9. The electrochemical cell of claim 1 wherein the force-fitted member is coated with a chemically inert material with respect to the cell's components.

10. The electrochemical cell of claim 6 wherein the vent orifice is disposed in the cover and the conductive tubular member is a cylindrical member.

11. The electrochemical cell of claim 1, 6 or 10 which employs a cathode-electrolyte which contains at least one liquid oxyhalide selected from the group consisting of thionyl chloride, sulfuryl chloride, phosphorus oxychloride, thionyl bromide, chromyl chloride, vanadyl tribromide and selenium oxychloride.

12. The electrochemical cell of claim 1 wherein said cell has been manufactured utilizing a method comprising the steps of:
  (a) placing the solid components of a cell within the container of a cell's housing, said housing comprising the container having secured at its open end a cover and said housing having at least one vent orifice;

(b) feeding the liquid component of the cell through the vent orifice into the housing; and (c) force-fitting a member and a film or sheet of corrosion-resistant material into the vent orifice in which at least one of said member and said material is resiliently deformable such that the corrosion-resistant material becomes disposed at the interface of the wall defining the vent orifice and the force-fitted member thereby providing a fluid-tight seal at said vent orifice.

13. The electrochemical cell of claim 12 wherein step (d) is added as follows:

(d) placing a layer of a sealant over the force-fitted member and the area of the housing defining the vent orifice.

14. The electrochemical cell of claim 12 wherein in step (a) at least one tubular member surrounds at least one vent orifice, and in step (d) the layer of sealant is placed within said tubular member over the force-fitted member in the vent orifice and over the area of the housing defining the vent orifice that is surrounded by the tubular member.

15. The electrochemical cell of claim 1 wherein said cell has been manufactured utilizing a method comprising the steps of:

(a) placing the solid components of a cell within the container of a cell's housing, said housing comprising the container having secured at its open end a cover and said housing having at least one vent orifice wherein the wall defining said vent orifice has a liner or coating of a corrosion-resistant material;

(b) feeding the liquid component of the cell through the vent orifice into the housing; and (c) force-fitting a member into the vent orifice in which at least one of said member and said material is resiliently deformable such that the corrosion-resistant material is disposed between the force-fitted member and the wall defining the orifice thereby providing a fluid-tight seal at said vent orifice.

16. The method of claim 15 wherein (d) is added as follows:

(d) placing a layer of a sealant over the force-fitted member and the area of the housing defining the vent orifice.

17. The method of claim 16 wherein in step (a) at least one tubular member is secured to the housing and surrounds at least one vent orifice, and in step (d) the layer of sealant is placed within said tubular member over the force-fitted member in the vent orifice and over the area of the housing defining the vent orifice that is surrounded by the tubular member.

* * * * *